Oct. 12, 1943.   J. O. PARR, JR   2,331,624
METHOD OF AND APPARATUS FOR SEISMIC SURVEYING
Filed May 8, 1940   2 Sheets-Sheet 1
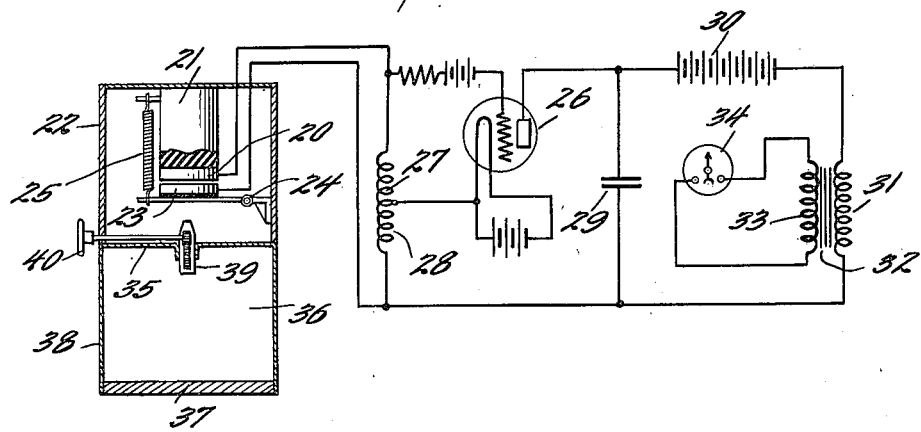
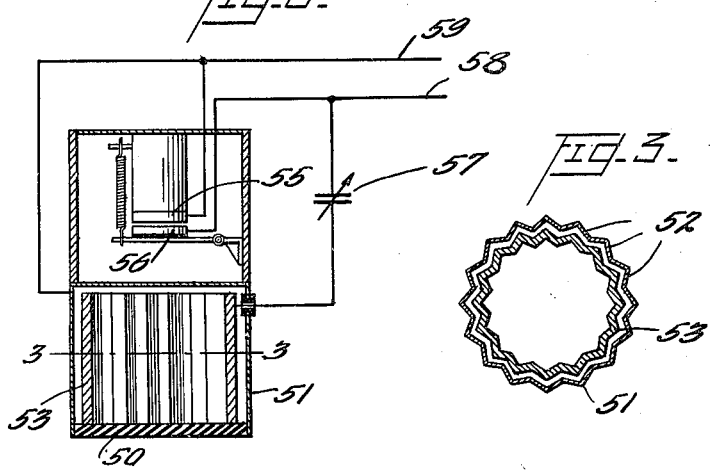
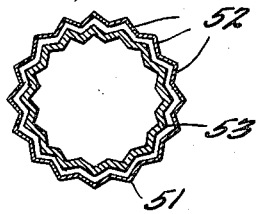
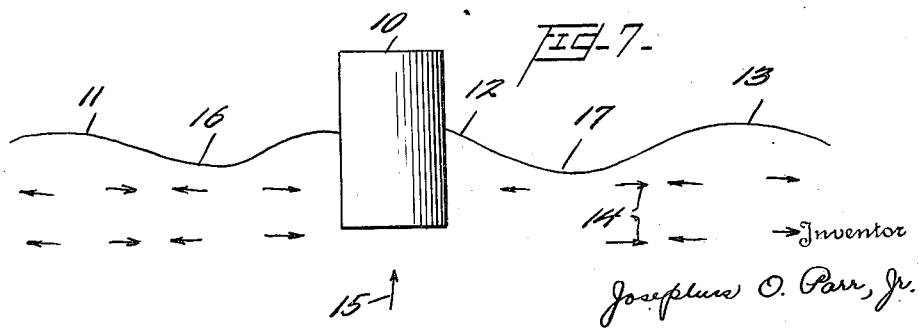
Inventor
Josephus O. Parr, Jr.
By Watson, Cole, Grindle & Watson
Attorney Oct. 12, 1943.　　　J. O. PARR, JR　　　2,331,624
METHOD OF AND APPARATUS FOR SEISMIC SURVEYING
Filed May 8, 1940　　　2 Sheets-Sheet 2
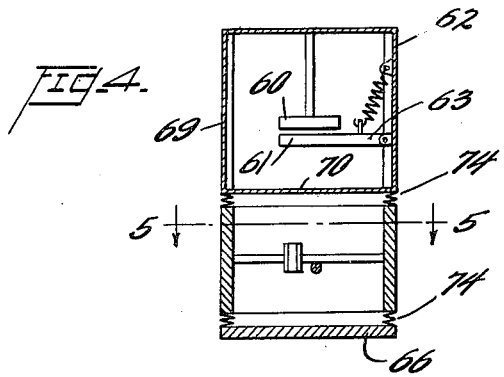
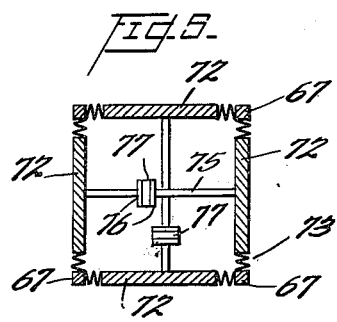
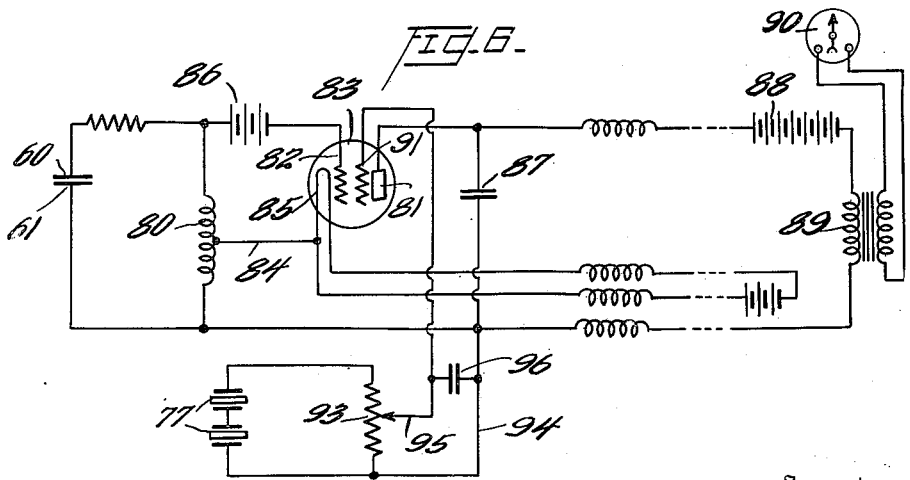
Inventor
Josephus O. Parr, Jr
By Watson, Cole, Grindle & Watson
Attorney Patented Oct. 12, 1943

2,331,624

UNITED STATES PATENT OFFICE 2,331,624

METHOD OF AND APPARATUS FOR SEISMIC SURVEYING

Josephus O. Parr, Jr., San Antonio, Tex., assignor to Olive S. Petty, San Antonio, Tex.

Application May 8, 1940, Serial No. 334,049

14 Claims. (Cl. 177—352)

The present invention relates to improved methods of and apparatus for conducting seismic surveys and deals particularly with the problem of suppressing or nullifying the effects of ground displacements resulting from earth compressions which in turn are caused by the arrival of undesirable waves.

It is a general object of the present invention to provide novel methods of and apparatus for suppressing or nullifying the effects of ground displacements resulting from compressional waves while at the same time permitting the recording of those components of wanted waves acting along substantially vertical axes.

More particularly it is an object of the invention to provide a method for eliminating or substantially reducing the effect of the vertical components of waves acting horizontally while wanted waves are recorded in any desired manner, without changing the recorded characteristics of the wanted waves due to such other energy arriving at the same time, by using the energy of compression of the unwanted waves to provide means for counteracting those components thereof which would produce a detrimental effect on the final result if permitted to be recorded.

An important feature of the invention consists in the construction of a novel transducer including seismometer parts adapted to be affected both by the wanted waves and by components of ground compressions resulting from unwanted waves which act along axes parallel to those of the wanted waves, together with means responsive to the compressional energy of the unwanted waves acting normal to said axes for producing a countervailing effect on the seismometer for the purpose of nullifying the unwanted ground displacements.

More specifically, the invention proposes several forms of transducers, the seismometer elements of which may be of any of the recognized forms together with associated equipment for deriving energy from the horizontal compression of the ground, converting said energy into a usable form, and balancing a desired proportion thereof against the effect of ground displacement on the seismometer.

Other and further features and objects of the invention will be more apparent to those skilled in the art upon a consideration of the accompanying drawings and following specification wherein are disclosed several exemplary embodiments of the apparatus for carrying out several of the methods of the present invention with the understanding that such combinations and rearrangements of the elements of this apparatus may be made as fall within the scope of the appended claims without departing from the spirit of the invention.

In said drawings:

Figure 1 is a schematic and diagrammatic showing of a transducer seismometer and associated compensating mechanism together with the circuits necessary for applying the output to a recording galvanometer;

Figure 2 is a schematic showing of another transducer-compensator combination;

Figure 3 is a section on line 3—3 of Figure 2;

Figure 4 is a vertical section through a further form of transducer-compensator;

Figure 5 is a section on line 5—5 of Figure 4;

Figure 6 is a circuit diagram of the device of Figure 4; and

Figure 7 is a schematic showing of the arrangement of the apparatus of Figures 1, 2 or 4 showing the pressures thereon when subjected to a compressional wave.

In the practice of geophysical exploration where use is made of seismic surveying for determining the depths and slopes of strata interfaces, it is customary to produce artificial seismic waves by the explosion of a charge of blasting material beneath the weathered layer of the earth and to record, on a single record, the relative times of arrival of waves reflected from these interfaces, at a plurality of seismometer stations. In the most commonly encountered surface soils as well as in the various strata being surveyed, the artificially propagated and reflected seismic waves most desirable for recording purposes travel in such a manner that particles in their path are displaced in a direction along the direction of wave travel. Seismometers which are not placed at too great a distance from the blast are acted on largely by waves whose vertical components predominate. Seismometers for such work are almost universally constructed therefore to have their moving elements operate along a vertical axis for recording this vertical component. In certain sections of the country there occur what are colloquially known as "bad areas" where serious interference with the orderly arrival of the reflected waves, which it is desired to record, results from the vertical displacement caused by the compression of the ground under the detector due to combinations of transverse, Rayleigh, and other waves. They may have been reflected or refracted from shallow beds or they may comprise either longitudinal or transverse waves propagated nearly horizontally from the artificial source and travelling near the surface of the ground. Such undesirable waves are very heavy in certain areas and it can be seen that when the ground near the surface is subjected to compression parallel to its surface that there will be resultant vertical displacements, upwardly at the compression portion of each cycle and downwardly at the dilational portion. These vertical displacements or components of the unwanted waves may oftentimes be larger than the vertical components of the wanted or reflected waves so that the recordings of the seismometers are of such a jumbled nature that it is almost impossible to use them for effective computations as to slopes and depths of interfaces.

In accordance with the present invention it is proposed to make use of the energy of compression of unwanted waves for creating, in phase with their vertical displacements, means for counteracting the effect of the vertical displacement on the seismometer elements or for counteracting the result of this displacement, leaving the final output of the seismometer which is to be recorded substantially the same as if there had been no undesired waves present.

As stated above, there are two broad methods of eliminating the effacement effects of the compressional wave displacements on the seismometer record, the first being a means for using the compressional energy to prevent or counteract movement of the seismometer elements in response to the vertical displacement caused by the compressional waves, and, the second, in which the seismometer elements are permitted to be displaced by this unwanted vertical component, but the energy of the compressional wave is used to provide means for nullifying the effect of this movement on the recording equipment. Various means may be used for carrying out either of the above methods, and while two have been shown for the purposes of this description, it will be appreciated that any type of seismometer may be made use of in connection with either of the methods and that various counteracting forces and means may be generated by the undesired waves.

Referring now to the drawings for a further appreciation of the invention and first to Figure 7, there is shown at 10 the casing of the apparatus constructed in accordance with the present invention, mounted vertically and partially buried in the surface of the ground, along which are shown to be moving, in exaggerated form, a plurality of compressional waves 11, 12, and 13 advancing in the direction of the width of the paper and causing the compressions and rarefactions of the ground as illustrated by the arrows 14. Such waves may extend for a considerable depth and wherever there is a crest on the surface of the ground or even if such crest does not appear, there is an upward vertical pressure, as illustrated by the arrow 15, which tends to produce an upward displacement of the instrument 10. This displacement can be said to result solely from the compressional wave and changes its sign as any rarefactional area such as 16 or 17 passes under the apparatus.

Any conventional form of seismometer such as used for geophysical prospecting responds primarily to vertical displacement and the recording galvanometer to which it is attached will, under ordinary circumstances, make a record of vertical earth displacements in accordance with the type of seismometer. If it is a true displacement type, the record will closely approach the actual ground displacements although, as is more common, if a magnetic type of seismometer is used, the resultant trace will be somewhere between a velocity and acceleration curve of the ground displacement.

If, in addition to the more or less horizontally travelling and undesired compressional waves, there arrive at the seismometer the desired reflected waves having large vertical components, producing vertical displacements of the seismometer, it will be seen that some of these latter waves will be augmented by in-phase portions of the compressional displacements and others will be more or less nullified when the phases differ by 180°. In between these maximum conditions, intermediate ones may exist, as will be appreciated.

Seismometers of the type used for surveying are in general transducers, converting the energy of seismic waves to varying electric currents which can readily be recorded. The one illustrated in Figures 1 and 2 is of the so-called condenser type, such as more fully disclosed in the application of O. S. Petty, Serial No. 324,013, filed March 14, 1940. In this application the complete mechanism and circuits of such a device are shown and described. For the purpose of the present invention it may suffice to say that such a seismometer comprises a condenser plate 20 attached by means of insulation 21 firmly to the frame or casing 22 of the apparatus for movement therewith under the action of ground waves. A so-called steady-mass, or suspended weight, includes a cooperating condenser plate 23. This mass may be hinged as at 24 to the frame or casing and supported by means of a spring 25 to provide a repose spacing between the condenser plates such as to control, to a desired frequency, the operation of the vacuum tube oscillating circuit shown to the right. The spring 25 exerts a restoring force which brings the plate spacing back to normal between seismic shocks. Any movement of the casing corresponding to upward ground movement tends to separate the plates since the lower plate is combined with a steady-mass of considerable inertia, whereas downward movement of the casing tends to bring the plates closer together. This well known operation varies the frequency of oscillation of the circuit in a manner described in detail in the aforementioned application. It is sufficient to state that the circuit includes a thermionic triode 26, a grid coil 27, a coupled plate coil 28, a condenser 29, and a source of energy 30. Changes in the rate of oscillation of the circuit cause corresponding changes in the current flowing from the battery 30 which flows in the primary 31 of the transformer 32. This induces changes in the current flow in the secondary circuit 33 connected to the recording galvanometer 34, which therefore traces a faithful reproduction of the condenser plate displacement, velocity, acceleration, or combination of these movements in accordance with the construction of the seismometer, the periodicity of the steady-mass, the strength of the restoring spring and other factors.

A horizontal partition 35 substantially closes off the casing 22 just below the seismometer elements, providing an air chamber 36 which has a very rigid bottom 37 and thin side walls 38. The apparatus is buried as shown in Figure 7, at least for the depth of the air chamber, so that when subjected to a compressional wave, the volume of the air chamber is reduced and a puff of air is forced through the nozzle 39 mounted in the plate 35, and this puff of air impinging on the undersurface of the lower plate or of the steady-mass exerts a lifting force on the same. By adjusting the nozzle 39 upwardly or downwardly by means of the external knob 40, the intensity effect of the air blast on the steady-mass can be regulated.

If we consider that an undesired wave is passing beneath the apparatus, as shown in Figure 1, it will be seen that the upward vertical displacement tends to lift the plate 20 away from the plate 23 but at the same time the lateral compression of the chamber 36 produces a blast of air which exerts a lifting force on the lower plate pressing it upwardly with substantially the same effort that inertia creates to force it downwardly, thereby cancelling the effect of the compressional wave vertical displacement on the seismometer elements. True reflected waves having vertical components with substantially zero compressional effects cause the same lifting of the plate 20 away from the plate 23 without the compensating air blast and a real change in plate displacement takes place which causes a current flow change to operate the galvanometer in the desired manner.

It will be evident that a magnetic type of seismometer could be used just as well as the capacity type, and the action would be substantially the same. Even the well-known acceleration type of seismometer making use of a piezo-electric crystal could be subjected to the compensation effected by the air compressing means of Figure 1.

In Figure 2 the seismometer elements shown in the casing are identical with those shown in Figure 1, but the lower half of the casing is of entirely different construction. Its heavy bottom wall 50 may be of insulation, and its outer wall 51 is still thin, as in the construction of Figure 1, but it is preferably corrugated as shown at 52. This form of outer casing might be used in Figure 1 to permit of better compressional effects. In the case of Figure 2, however, it is spaced slightly from a correspondingly shaped but more heavily constructed member 53. These two parts 51 and 53 form a substantially cylindrical condenser, the inner plate of which is stiff and rigid, and the outer plate of which is flexible so that compressional waves move all or a portion of it closer to the inner plate and increase the capacity, while waves of rarefaction draw it apart and reduce the capacity.

The condenser which is subjected to compression and rarefaction as just described is arranged to be connected in parallel to the condenser formed by the stationary and movable plates 55 and 56, respectively, of the seismometer, but in order to combine the proper proportions of the capacity change of the lower condenser in accordance with the type of ground encountered, its output is coupled to that of the seismometer condenser by means of a variable condenser 57 arranged in series and used to select the proportion of its output required for application to conductors 58 and 59 connected to the seismometer condenser which lead them to a circuit such as shown in Figure 1.

It will be seen that in this construction, upward displacement resulting from a compression of the ground separates the condenser plates in the seismometer, but the compression moves the plates of the cylindrical condenser more closely together, and thus as a resultant there is no change in the total capacity of the shunted condensers if the variable condenser is properly set. A pure reflected wave, however, has a vertical component which separates the seismometer condenser plates without effecting the plates of the cylindrical condenser so that this type of wave can be recorded in spite of the presence of unwanted waves.

A third embodiment of the invention is illustrated in Figures 4-6 inclusive. In this case there is disclosed an inertia type transducer operable substantially only in accordance with the vertical components of earth motions. It is illustrated again as of the condenser type comprising the plates 60 and 61 secured respectively to the casing 62 and the spring-suspended pivoted element or steady-mass 63. This is again housed in the upper portion of the casing preferably rectangular in configuration as shown in Figure 5. This casing comprises a rigid bottom 66 and rectangular corner posts 67 extending for the full height of the housing and sheathed at the upper part by a plurality of relatively thin walls 69 including the separating wall 70 dividing the upper portion of the casing from the lower.

The lower portion of the housing is of different construction as best illustrated in Figure 5, where the relatively stiff and structurally strong side wall members 72 are attached to the corner posts, bottom 66, and separating wall 70 by flexible members 73 and 74. These may be accordion-pleated sheets of thin metal or the like, the purpose being to permit a change in the volume of the lower chamber as the result of pressure exerted laterally on the walls 72.

Opposite walls 72 support aligned columns 75, each provided on its free end with a disc 76 and between the facing parallel discs is arranged a piezo-electric crystal 77 which may be of conventional construction.

As shown in Figure 5 each set of opposed walls cooperates with a crystal so that pressure in any horizontal direction will increase or decrease the pressure on one or both of the crystals, thereby causing them to generate a positive or negative voltage in the usual manner. As in the first two embodiments, it will be seen that the instrument comprises a transducer of the electromechanical type which is responsive only to substantially vertical motion components and a seismometer of the pure compression type responsive only to lateral compressions or dilations.

In use, the apparatus of Figures 4 and 5 is connected as shown in Figure 6. Here the transducer plates 60 and 61 are shunt connected so as to tune the inductance 80 which is connected between the anode 81 and control grid 82 of the thermionic tube 83 forming an oscillating circuit. A center tap 84 from the inductance is connected to the cathode 85 of the tube. The grid-bias battery 86 is connected as shown and a by-pass condenser 87 completes the circuit for the oscillating current around the anode battery 88. The anode current passes through the primary 89 of a suitable iron core transformer and the secondary output is delivered to a recorder 90 as shown, a conventional amplifier being interposed in the circuit if desired. This circuit is substantially identical to that shown in Figure 1 where variations in the spacing of the plates 60 and 61 produce changes in oscillation frequency and hence in the plate-current flow, which can be recorded.

The thermionic tube is provided with an additional grid 91 affording a further control of the magnitude of the R. F. oscillation in accordance with the potential or potentials produced by the two piezo-electric crystals. These are illustrated at 77, 77 connected in series with each other and the potentiometer 93. One terminal of the potentiometer is connected by the conductor 94 to the anode-return circuit, while the other, which constitutes the slider 95, is directly connected to the grid 91. A suitable radio frequency by-pass condenser 96 shunts the potentiometer output.

It will be seen that voltages generated by the two crystals will be additive if they are both compressed or both dilated, and subtractive if one is compressed and the other dilated. The total output, which may at times be zero, is apportioned by means of the slider 95 to the proper amount to counteract the displacement effect of the compression waves on the condenser-plate transducer, so, in the manner already described in connection with the previous embodiments, this effect is substantially nullified and the total output as indicated on the recorder 91 is substantially that resulting from earth displacements caused by the wanted and reflected seismic waves.

Having thus described the invention, what is claimed as new and desired to be secured by Letters Patent is:

1. The method of eliminating or reducing the effect on a seismometer responsive to vertical displacements of the vertical components of originally travelling compressional waves comprising converting compressional energy of such waves as distinguished from displacement energy into a controllable form and causing said controlled energy to counteract only the said components while leaving the true displacement components intact.

2. The method of seismic surveying in so-called "bad areas" where compressional waves travelling substantially horizontally exert vertical components which interfere with seismometer recordings of reflected waves comprising collecting energy from the horizontal squeezing effects of the compressional waves which effects are 180° out of phase with said vertical components and balancing the same against the interfering vertical components.

3. The method of recording the vertical components of reflected seismic waves arriving at a station during the presence of compressional waves having interfering vertical effects comprising actuating a transducer at said station by means of the wanted and unwanted vertical components and substantially cancelling the unwanted component effects on said transducer by energy obtained in phase opposition therewith from the squeezing effect of the compressional waves.

4. The method of deriving energy pulsations having a definite relation to the vertical components of reflected seismic waves arriving at a station during the presence of substantially horizontal compressional waves which produce interfering vertical displacements, comprising subjecting a vertical component transducer to the said vertical components and the said vertical displacements, obtaining energy from the horizontal compressional forces of the compressional waves, and delivering the same to said transducer in opposition to the energy of said vertical displacements, whereby the output of the transducer is substantially restricted to that produced by the reflected waves.

5. The method of deriving energy pulsations having a definite relation to the vertical components of reflected seismic waves arriving at a station during the presence of undesired substantially horizontal compressions which produce interfering vertical displacements, comprising subjecting a vertical component transducer to the said vertical components and the said vertical displacements, deriving energy in mechanical form from the compressions, and delivering the same to said transducer in opposing phase to said vertical displacement.

6. The method of deriving energy pulsations having a definite relation to the vertical components of reflected seismic waves arriving at a station during the presence of substantially horizontal compressional waves which produce interfering vertical displacements, comprising subjecting a vertical component transducer to the said vertical components and the said vertical displacements, deriving energy in mechanical form from the compressional waves, adjusting the quantity thereof, and delivering the same to said transducer in nullifying quantity and opposing phase to said vertical displacement, whereby the output of the transducer is substantially restricted to that produced by the reflected waves.

7. The method of deriving energy pulsations having a definite relation to the vertical components of reflected seismic waves arriving at a station during the presence of substantially horizontal compressional waves which produce interfering vertical displacements, comprising subjecting a vertical component transducer having a fixed and a movable part to the said vertical components and the said vertical displacements, compressing air by the action of the compressional waves, and delivering the same against the said movable part in opposition to the action of the said displacements thereon.

8. The method of deriving energy pulsations having a definite relation to the vertical components of reflected seismic waves arriving at a station during the presence of substantially horizontal compressional waves which produce interfering vertical displacements, comprising subjecting a vertical component transducer having a fixed and a movable part to the said vertical components and the said vertical displacements, delivering air in puffs against said movable part, controlling the energy of each puff to oppose the action of each said vertical displacement on the movable part, and regulating the delivery of said puffs by the action of the compressional waves.

9. A seismic transducer comprising a portion movable in response to ground displacement, a steady mass suspended from said portion in such a manner as to provide for vertical component response, means providing a restoring force between said portion and mass, cooperating means on said portion and mass for controlling a recording galvanometer in response to relative movement of said cooperating means, means responsive to earth compressions for generating mechanical forces corresponding in time and intensity to said compressions, and means to apply said forces to said steady mass simultaneously with their generation to oppose relative movement of said portion and mass resulting from vertical displacements incident to compression.

10. Apparatus for substantially eliminating direct waves from a mixture of direct and reflected seismic waves, which comprises means for producing pulsations of electric energy corresponding only to vertical wave components, means for producing pulsations of mechanical energy corresponding only to the compressional effects of the direct waves, means for adjusting the amplitude effect of the said mechanical pulsations, and means for opposing the last mentioned adjusted pulsations against the mechanical energy of the vertical component pulsations of the direct waves as applied to said first means to reduce the effect of the same, whereby the electrical pulsations correspond largely to the vertical components of the reflected waves.

11. Apparatus for substantially eliminating direct waves from a mixture of direct and reflected seismic waves, which comprises means for producing pulsations of electric energy corresponding only to vertical wave components, means for producing pulsations of mechanical energy corresponding only to the compressional effects of the direct waves, and means for opposing the last mentioned pulsations against the mechanical energy of the vertical component pulsations of the direct waves as applied to said first means to at least partially eliminate the same, whereby the electrical pulsations correspond in the main to the vertical components of the reflected waves.

12. Apparatus for producing electrical energy pulsations having a definite relation to the vertical components of desired seismic waves arriving at a station during the presence of compressional waves acting laterally to produce interfering vertical displacements, comprising, a transducer actuated solely by substantially vertical components of earth motions to produce wave-form electrical energy, a seismometer actuated solely by squeezing thereof by lateral compressions of the earth to produce wave-form electrical energy, said seismometer having zero response to lateral displacement and means to combine the energy outputs of said devices to compensate for said interfering vertical displacements.

13. The combination with an inertia type, earth displacement actuated, transducer of the electromechanical style, of a seismometer actuated solely by compression which results in changing the length of one horizontal axis thereof, and means to combine the effects of said devices for the purposes described.

14. In apparatus of the type described, in combination, a transducer having a steady mass and a support therefor displaceable relative thereto in response only to vertical components of earth displacements, a seismometer having portions movable toward each other to vary their spacing solely in response to lateral compressions and means to influence the output of said transducer by the output of said seismometer.

JOSEPHUS O. PARR, Jr.